(12) United States Patent
Riley et al.

(10) Patent No.: US 11,848,466 B2
(45) Date of Patent: Dec. 19, 2023

(54) VOLTAGE-BASED FUEL CELL CONTROL

(71) Applicant: Ford Global Technologies, LLC, Dearborn, MI (US)

(72) Inventors: Matthew Riley, Ann Arbor, MI (US); William Frederick Sanderson, Jr., Commerce Township, MI (US); Hao Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 17/669,886

(22) Filed: Feb. 11, 2022

(65) Prior Publication Data
US 2023/0261229 A1     Aug. 17, 2023

(51) Int. Cl.
   *H01M 8/0438* (2016.01)
   *H01M 8/04537* (2016.01)
   *H01M 8/04955* (2016.01)

(52) U.S. Cl.
   CPC ... *H01M 8/04955* (2013.01); *H01M 8/04388* (2013.01); *H01M 8/04559* (2013.01); *H01M 2250/20* (2013.01)

(58) Field of Classification Search
   CPC ......... H01M 8/04955; H01M 8/04388; H01M 8/04559; H01M 2250/20
   USPC .............................................. 429/429
   See application file for complete search history.

(56) References Cited

U.S. PATENT DOCUMENTS

| | | | |
|---|---|---|---|
| 9,017,886 B2 | 4/2015 | Harris et al. | |
| 2015/0115899 A1* | 4/2015 | Lee | B60L 7/18 320/160 |
| 2017/0250424 A1* | 8/2017 | Tano | H01M 8/04567 |
| 2020/0220183 A1 | 7/2020 | Janarthanam et al. | |

FOREIGN PATENT DOCUMENTS

| | | |
|---|---|---|
| CN | 100391041 C | 5/2008 |
| JP | 5046497 B2 | 10/2012 |
| WO | 2008118962 A1 | 10/2008 |

* cited by examiner

*Primary Examiner* — Christian Roldan
(74) *Attorney, Agent, or Firm* — David B. Kelley; Brooks Kushman P.C.

(57) ABSTRACT

A fuel cell system has a fuel cell stack including a plurality of fuel cells and an anode injector system, and a controller programmed. The controller, responsive to an amplitude of cyclic changes in voltage of at least some of the fuel cells exceeding a threshold, a frequency of the cyclic changes being within a predetermined range of a frequency associated with the anode injector system, and the voltage being less than a predetermined value, disables the fuel cell stack.

6 Claims, 5 Drawing Sheets

VOLTAGE-BASED FUEL CELL CONTROL

TECHNICAL FIELD

This disclosure relates to fuel cell stacks and the control thereof.

BACKGROUND

Within the context of a hydrogen fuel cell, hydrogen may be supplied to an anode and air may be supplied to a cathode. A catalyst at the anode separates hydrogen molecules into protons and electrons, which follow different paths to the cathode. The electrons flow through an external circuit to generate electricity.

SUMMARY

A fuel cell system has a fuel cell stack including a plurality of fuel cells and an anode injector system, and a controller. The controller, responsive to an amplitude of cyclic changes in voltage of at least some of the fuel cells exceeding a threshold, a frequency of the cyclic changes being within a predetermined range of a frequency associated with the anode injector system, and the voltage being less than a predetermined value, disables the fuel cell stack. The controller further, responsive to the amplitude exceeding the threshold, the frequency of the cyclic changes being within the predetermined range, and the voltage being greater than the predetermined value, maintains operation of the fuel cell stack.

A method includes, responsive to an amplitude of cyclic changes in voltage of a plurality of fuel cells exceeding a threshold, a frequency of the cyclic changes being within a predetermined range of a frequency associated with an anode injector system, and the voltage being less than a predetermined value, increasing a concentration of hydrogen in anodes of the fuel cells.

A vehicle includes a fuel cell system that produces electric current, and a controller. The controller, responsive to an amplitude of cyclic changes in voltage associated with the fuel cell system exceeding a threshold, a frequency of the cyclic changes being within a predetermined range of a frequency associated with an anode injector of the fuel cell system, and the voltage being less than a predetermined value, reduces a magnitude of the electric current. The controller further, responsive to the amplitude exceeding the threshold, the frequency of the cyclic changes being within the predetermined range, and the voltage being greater than the predetermined value, maintains the magnitude of the electric current.

DETAILED DESCRIPTION

Figure 1A:
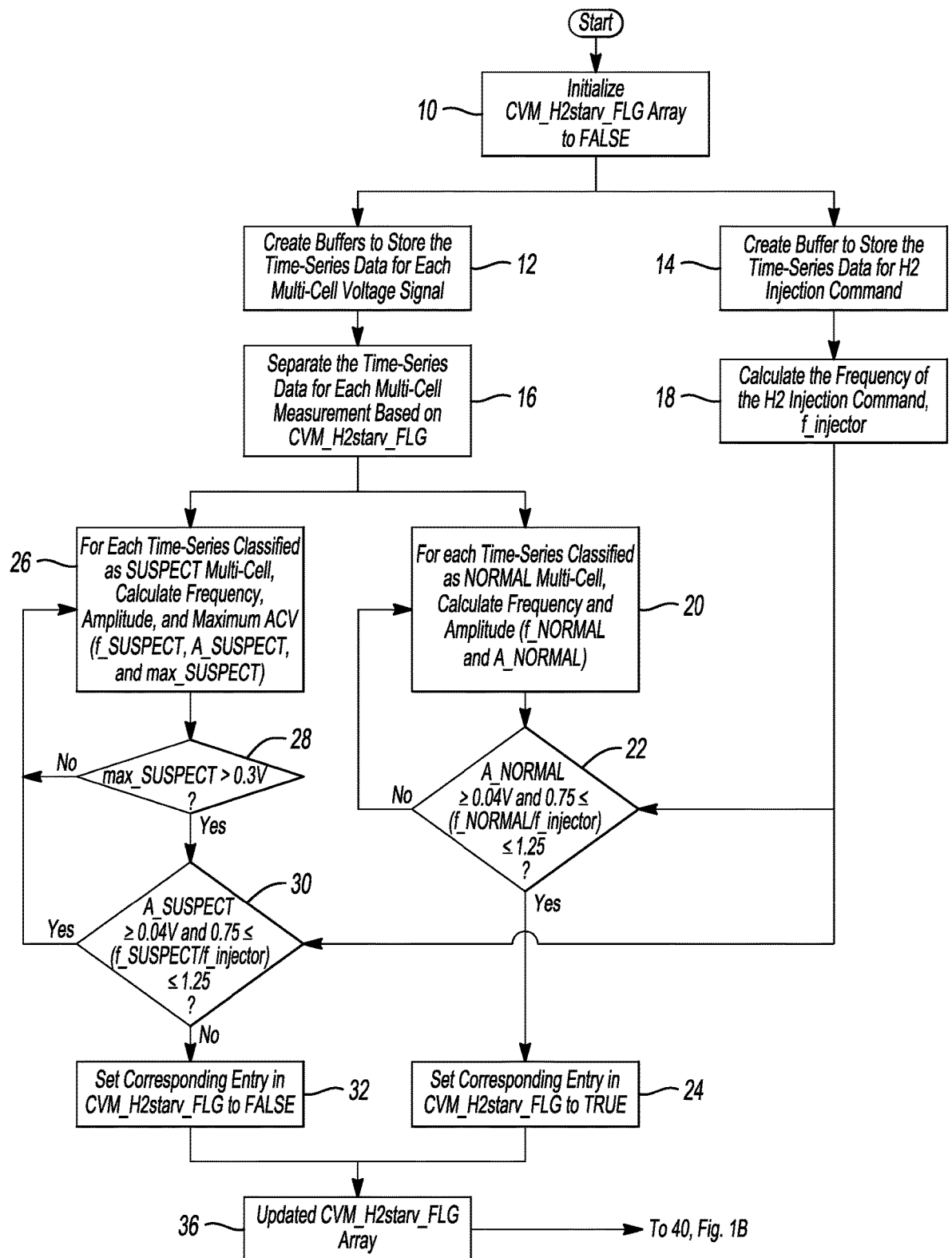
FIGS. 1A and 1B are flow charts of an algorithm for fuel cell control.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Fuel starvation in fuel cells can create issues. During a fuel starvation event, the anode potential rises above the cathode potential, the cell voltage reverses significantly, and permanent corrosion of the carbon support in the hydrogen oxidation reaction catalyst may occur. The occurrence of fuel starvation is most common during start up from frozen conditions, but it can also occur at other times due to liquid water flooding of the anode, anode purging issues, fuel quality issues, etc.

It may be possible to avoid fuel starvation through cell design, system design, and system operation. This, however, may not be practical. As a result, other mitigations strategies are contemplated herein.

One strategy to avoid issues from fuel starvation is to detect the voltage reversals just as they start and then take procedural actions to stop them. Detection usually means that the voltage of every individual cell is measured accurately and quickly. Performing voltage measurements at the single cell level in a large stack requires a cell voltage monitor. The cell voltage monitors that are commercially available are typically expensive. One way to reduce such expense is to measure small groups of adjacent cells, such as in pairs, triples, etc., rather than every individual cell. Even cell pair measurement rather than single cell measurement can reduce the expense and complexity of a cell voltage monitoring system significantly.

A drawback of multi-cell measurement is loss of fidelity. For example, consider a cell pair that has a total voltage of zero volts. The pair could have two cells at zero volts, or one cell could be at 0.5V and the other cell could be at −0.5V. It may be helpful to know if a cell is beginning to have a voltage reversal from fuel starvation so that corrective action can be taken immediately. In some operating scenarios, cells may have a reduced voltage for desirable reasons, or for reasons other than from fuel starvation. When individual cell voltage values are not available however, it can be difficult to diagnose the root cause and take the appropriate action. A response based solely on the voltage value leading to either can result in overly conservative actions that may cause loss of use, or a belated response that does not prevent the occurrence of some permanent stack issue.

It may be desirable to run at low cathode air stoichiometric conditions to produce additional waste heat for fast warmup. The freeze start up mode usually results in cell voltages being significantly lower than during normal operation. During freeze start up, it is not uncommon for some cell voltages to go to zero from air starvation while still being acceptable, but anode starvation is also more likely during freeze start up. A cell pair's voltage that is low in this situation may be from something desirable or otherwise. Making a judgement based on the pair's voltage alone is not certain. As noted previously, waiting until a cell pair's voltage indicates one of those two cells is clearly suffering from fuel starvation may be too late.

Another strategy is to act based on the rate of change of voltage, with the assumption that fuel starvation will cause a more rapid voltage decrease. The voltage rates of change from fuel starvation, however, may not be rapid enough to distinguish it as fuel starvation. Also, when combined in a pair, the pair's rate of change may be attenuated if only one cell has fuel starvation.

When a cell is starting to suffer from fuel starvation, its voltage will usually fluctuate if there are changes in hydrogen partial pressure in the cell. The partial pressure in the cell will change as the total pressure in the anode changes. When the anode pressure is controlled by injector(s), where the anode pressure cycles with pulses from the injector valve cycling, the voltage in a cell with partial fuel starvation will pulse at the same frequency. As the fuel starvation worsens, the voltage decreases. The voltage cycling, however, often tends to become less distinct. The indication of fuel starvation thus becomes less certain—especially when in a multicell group where only one cell is fuel starved. The group's value and thus the voltage cycling alone as a criterion for immediate action may not always be dependable.

Here, proposed concepts intend to leverage the characteristics noted previously to improve the detectability of fuel starvation from other less harmful causes of low cell voltages, which may be necessary for systems using multi-cell voltage measurements that do not have the benefit of having measurements of every cell voltage. It is proposed to monitor all cell pairs (or other multi-cell measurement groups) for indications that fuel starvation is starting before the cell voltage goes close to zero volts. This may be accomplished by monitoring for pair voltages that are varying up and down at a significant amplitude and at a frequency close to that of the injector cycling and/or the frequency of the anode pressure, which may also be indicated by changes in current associated with the injector or commands to actuate the injector. Those cell pair numbers would be classified as suspect, while the others would be considered normal. Once a pair is identified as suspect, it remains in that group until that voltage variation (in tune with the injector) while in the typical voltage range (i.e., well above 0 V) clearly stops. A pair can be moved from normal to suspect if it varies at any time, but to move from suspect to normal it should stop varying while it is in a typical voltage range (i.e., well above 0 V). The classification of cell pairs in this way could be used to determine several forms of control responses to attempt to alleviate the fuel starvation. One application proposed uses two criteria for low voltage shutdown, or initiation of other mitigating actions such as increasing a concentration of hydrogen in anodes of the fuel cells via opening the exhaust vent for longer periods or more frequently to expel anode gasses and replace such with pure hydrogen from the anode injector system, reducing current output by the fuel cell system via a reduction in current demand from the fuel cell system, etc. For cell pairs that are in the suspect group, a more conservative low voltage threshold is applied. For cells in the normal (thus, not showing signs of any fuel starvation) group, a slightly less conservative voltage criteria would be applied. For systems that do not cause the anode pressure to vary in a cyclic fashion, these techniques may not be useful.

Figure 1B:
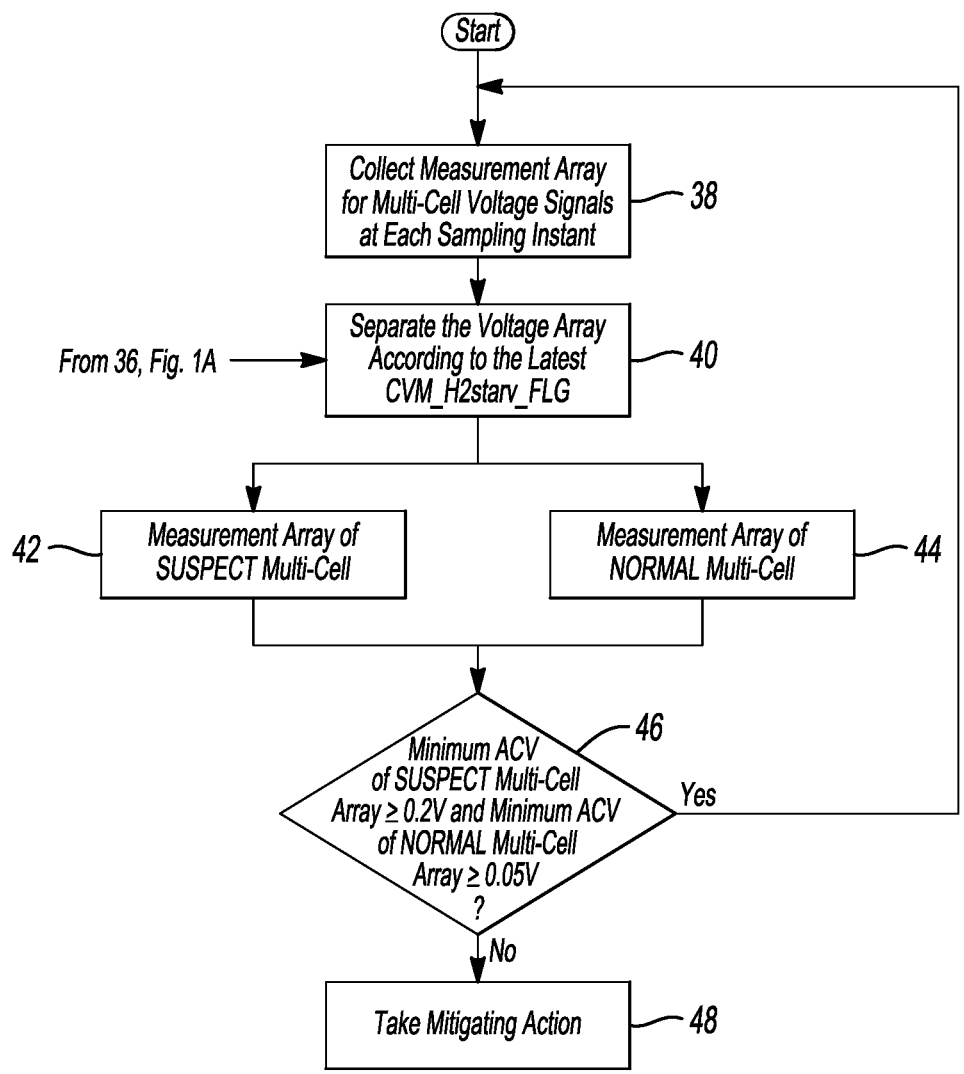

FIGS. 1A and 1B show example algorithms. Sample values are provided for illustration purposes and may be different depending on system implementation. Two primary tasks in this example are provided described, Suspect Multi-Cell Measurement Arbitration and Cell Reversal Detection, which likely would be executed at different task rates. The main task is the Suspect Multi-Cell Measurement Arbitration. Its output could be used for a variety of mitigation strategies, some of which were mentioned above. It is shown with a cell reversal detection and alert strategy. In the Suspect Multi-Cell Measurement Arbitration task, CVM_H2starv_FLG is an array with the size as the number of multi-cell measurements. Each entry of CVM_H2starv_FLG is Boolean (False=NORMAL and True=SUSPECT) and corresponds to a specific multi-cell group. The multi-cell groups are all initialized to the NORMAL group herein, but the logic could be defined in the opposite way where all groups are defined as SUSPECT until the data confirms otherwise. To update CVM_H2starv_FLG, the suspect multi-cell measurement arbitration logic is executed at a slower task rate (e.g., 10 s) in order to capture the characteristics from the time-series data for each multi-cell measurement. Certain patterns observed from the time-series data are used as criteria to determine if Normal Multi-Cell should be arbitrated as Suspect, and vice versa. The task rate may seem slow, but it should be remembered that this concept is leveraging recent historical data to make a more informed (i.e., fault tolerant) decision on how to act in the immediacy. The Cell Reversal Detection task is executed at a faster rate (e.g., 20 ms) and leverages the Boolean array (CVM_H2starv_FLG) to separate the normal and suspect multi-cell measurements. For those suspect measurements, a more conservative voltage threshold is used to determine if there is cell reversal event, otherwise a more aggressive voltage threshold will be applied.

At operation 10, the CVM_H2starv_FLG array is initialized to FALSE. At operations 12 and 14, respective buffers are created to store the times series data for each multi-cell voltage signal and hydrogen injection command. At operations 16, 18, the time-series data for each multi-cell measurement is separated based on CVM_H2starv_FLG and the frequency of the hydrogen injection command, f_injector, is calculated using standard techniques, respectively.

At operation 20, for each time-series classified as NORMAL Multi-Cell, the frequency and amplitude (f_NORMAL and A_NORMAL) are calculated using standard techniques. At decision block 22, the algorithm proceeds to operation 24 if A_NORMAL≥0.04V and 0.75≤f_NORMAL/f_injector)≤1.25. Otherwise, the algorithm returns to operation 20. At operation 24, the corresponding entry in CVM_H2starv_FLG is set to TRUE.

At operation 26, for each time series classified as SUSPECT Multi-Cell, the frequency, amplitude, and maximum multi-cell voltage (f_SUSPECT, A_SUSPECT, and max_SUSPECT) are calculated using standard techniques. At decision block 28, the algorithm proceeds to operation 30 if max_SUSPECT is >0.3V. Otherwise, the algorithm returns to operation 26. At operation 30, the algorithm returns to operation 26 if A_SUSPECT≥0.04V and 0.75≤f_SUSPECT/f_injector)≤1.25. Otherwise, the operation proceeds to operation 32, during which the corresponding entry in CVM_H2starv_FLG is set to FALSE.

From operations 24 and 32, the algorithm proceeds to operation 36, in which the updated CVM_H2starv_FLG array is broadcast.

At operation 38, multi-cell voltage signals are collected at each sampling instant. At operation 40, the voltage array is separated according to CVM_H2starv_FLG, which thus creates the SUSPECT multi-cell measurement array and NORMAL multi-cell measurement array at operations 42, 44, respectively. At decision block 46, the algorithm returns to operation 38 (fuel cell operation maintained) if the minimum average cell voltage is ≥0.2V for the SUSPECT multi-cell measurement array and the minimum average cell voltage is ≥0.05V for the NORMAL multi-cell measurement array. Otherwise, the algorithm proceeds to operation 48, during which a mitigating action (e.g., generate alert, initiate shutdown, reduce current draw, etc.) is taken.

Figure 2:
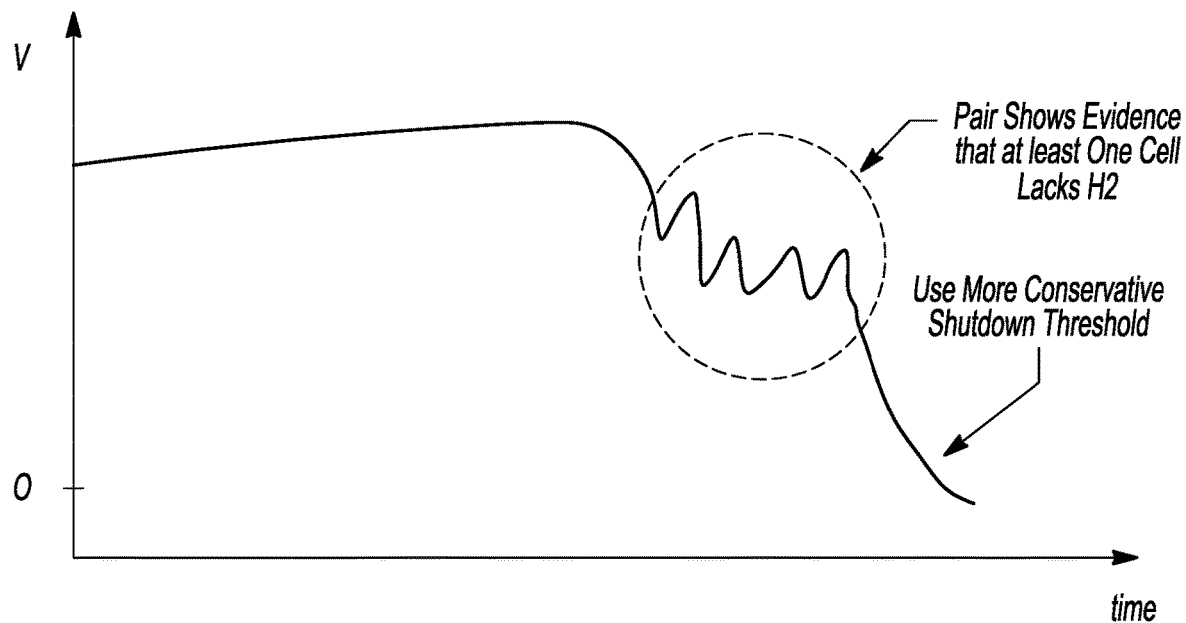
FIGS. 2, 3, and 4 are plots of cell voltage versus time.

FIG. 2 shows a cell pair's voltage over time in which one cell in the pair is starting to experience fuel starvation as evidenced by the voltage varying synchronously with the injector cycles (injector position not shown on the plot). At this point, it is classified as suspect. As the fuel starvation worsens, the voltage drops more. Voltage variation is less evident as the voltage drops, which is often the case as the starvation is more significant. A conservative (i.e., higher) voltage criteria would be used for this cell pair.

Figure 3:
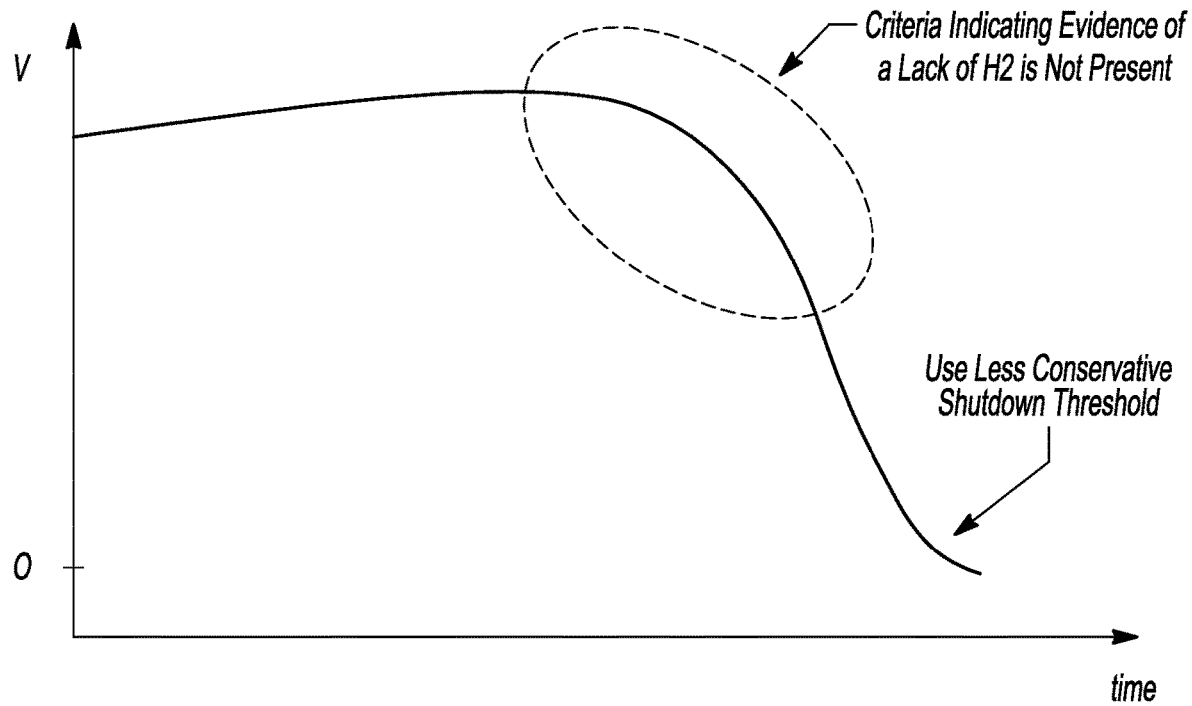

FIG. 3 shows another cell pair's voltage over time. The voltage is not varying with the injector cycles (injector position not shown) so the cell pair remains in the normal category. Later the voltage starts to drop. It is less likely that the voltage drop is caused by fuel starvation. A less conservative (i.e. lower) voltage criteria would be used for this cell pair.

Figure 4:
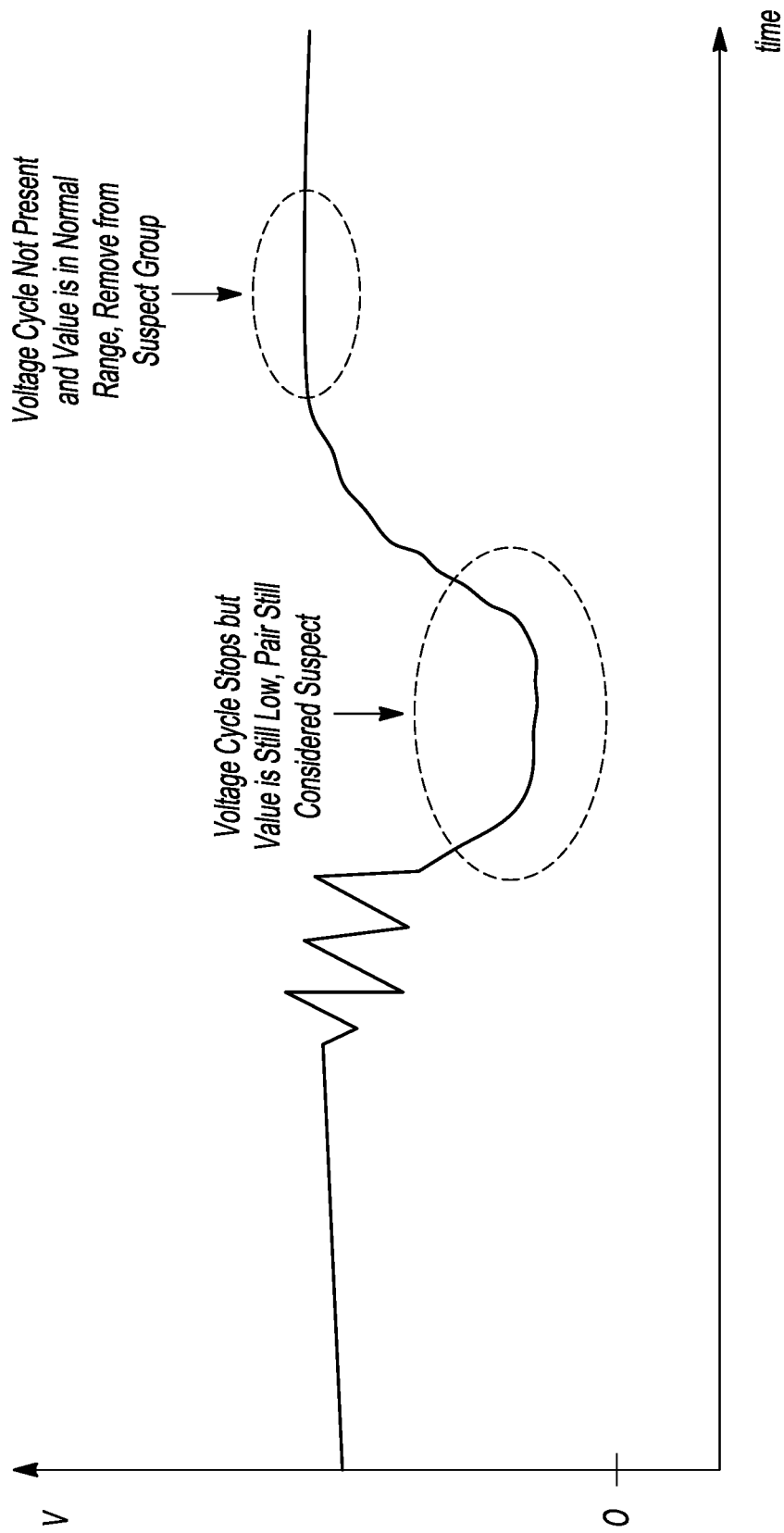

FIG. 4 shows another cell pair's voltage over time in which one cell in the pair is starting to experience fuel starvation and the voltage is varying synchronously with the injector cycles (injector position not shown). At this point it is classified as suspect. A bit later the voltage drops more, perhaps not quite low enough to meet the mitigating criteria, and the voltage stops varying. In this case the cell pair remains in the suspect group, because it is less certain that the partial fuel starvation situation has resolved when the voltage is at a low value. Subsequently, the voltage increases. At this point since the voltage is not varying with the injector, it is released from the suspect category. If the pair's voltage drops again, the mitigating criteria for normal cells would be applied.

As noted previously, it may be preferred to avoid a system shutdown to improve fault tolerance, but if fuel starvation was suspected of occurring, it may be helpful to take mitigating actions, including shutting down the fuel cell system. Depending on the operating mode, different criteria might be used for a low cell voltage shutdown level. During normal operation, low voltage cells would not be expected, and more conservative limits might be used, as opposed to other modes such as shutoff oxygen depletion mode or freeze start up low cathode air stoichiometric conditions mode.

For purposes of further explanation, assume the system is monitoring cell pairs, but all voltage numbers will be given as average cell voltage (ACV), i.e., the pair's value divided by 2. Assume Pair_x has an ACV that begins to vary at a 4 Hz frequency with an amplitude of +/−0.1V and the injector is also cycling at 4 Hz. Note this amplitude might be a single value or it might be a current dependent value to reduce signal to noise ratio. This might be within the criteria of voltage amplitude to consider the pair to indicate partial fuel starvation and classify this pair as suspect. At the same time another group, Pair_y, is operating with a nearly constant voltage. Further assume the operating mode was freeze start up low cathode air stoichiometric conditions mode, and pairs x and y experience a progressive decrease in voltage. A shutdown limit on Pair_x might be ACV=−0.05, whereas Pair_y's limit might be ACV=−0.2V, since Pair_x is suspect and Pair_y is normal. For Pair_x to have been taken back out of the suspect group, the amplitude of the variation must decrease to less than +/−0.02V or be varying at a frequency different than the injector's frequency by more than +/−25% while the ACV of the pair is >0.3V. Note these values are for illustrative purpose and may be different depending on system implementation.

Figure 5:
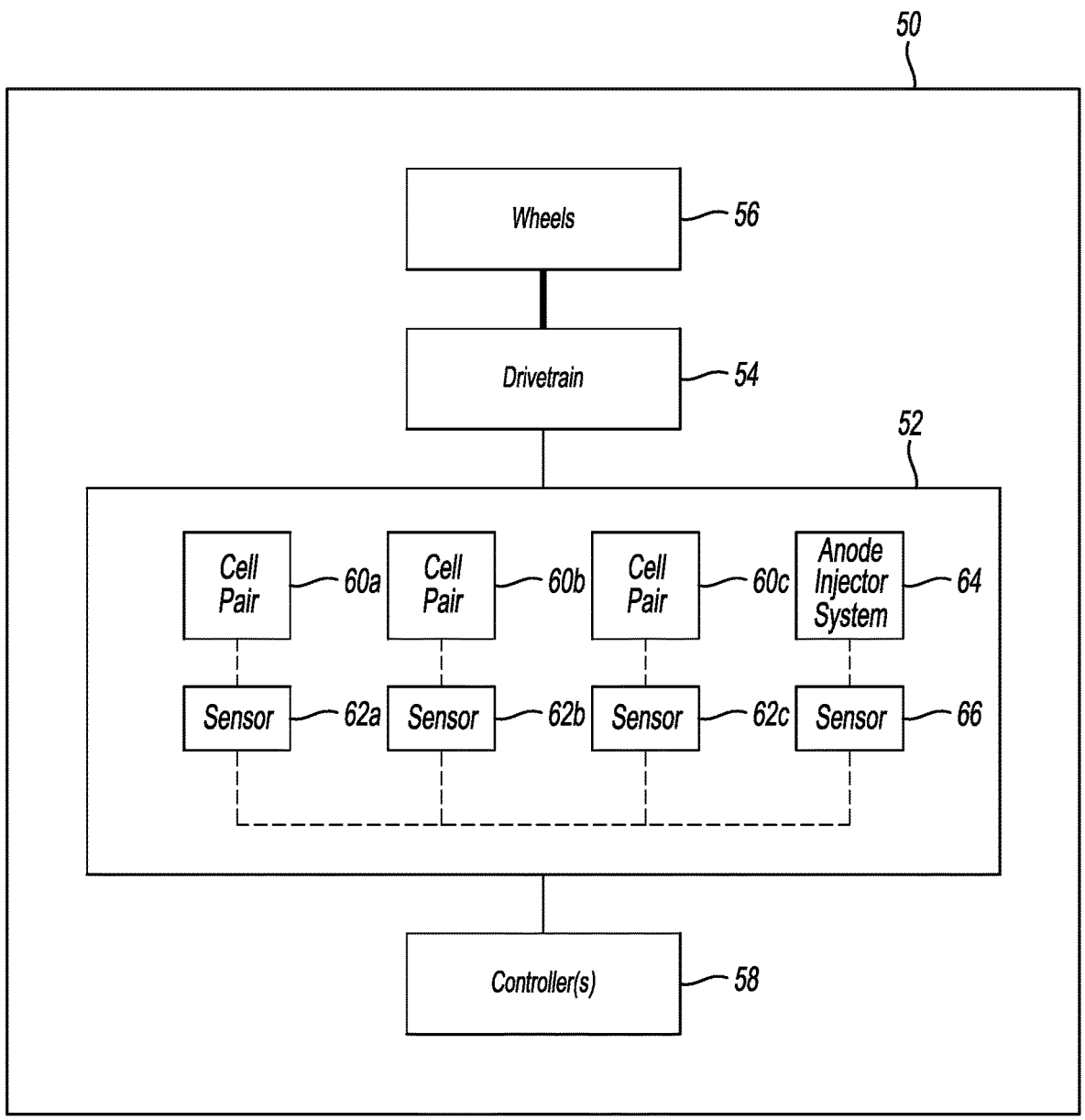
FIG. 5 is a schematic diagram of a vehicle.

FIG. 5 shows a vehicle 50 that includes a fuel cell system 52, other drivetrain components 54, wheels 56, and one or more controllers 58. The one or more controllers 58 are in communication with and control the fuel cell system 52. The fuel cell system 52 includes a plurality of cell pairs 60a, 60b, 60c, corresponding sensors 62a, 62b, 62c, an anode injector system 64, and corresponding sensor 66. The fuel cell system 52 produces electricity in typical fashion that is then provided to the drivetrain 54, which can include electric machines and the like. The drivetrain 54 thus can convert electric energy to mechanical energy and provide such to the wheels 56 to propel the vehicle 50. The sensors 62a, 62b, 62c collect the voltage data corresponding to the cell pairs 60a, 60b, 60c described above. The sensor 66 collects the pressure data corresponding to the anode injector system 64 described above. The one or more controllers 58 process the data using standard techniques to generate the various parameters described with reference to FIGS. 1A and 1B.

These strategies provide additional methods to monitor for fuel starvation. They leverage historical data prior to the immediacy to evaluate the operating nature of the fuel cells, which then can be used to make more informed decisions.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers. For example, a controller or a plurality of controllers may be programmed to perform the operations contemplated herein, etc.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a fuel cell system configured to produce electric current; and
a controller programmed to,
responsive to an amplitude of cyclic changes in voltage associated with the fuel cell system exceeding a threshold, a frequency of the cyclic changes being within a predetermined range of a frequency associated with an anode injector of the fuel cell system, and the voltage being less than a predetermined value, reduce a magnitude of the electric current, and
responsive to the amplitude exceeding the threshold, the frequency of the cyclic changes being within the predetermined range, and the voltage being greater than the predetermined value, maintain the magnitude of the electric current.

2. The vehicle of claim 1, wherein the controller is further programmed to, responsive to the amplitude exceeding the threshold, the frequency of the cyclic changes being within the predetermined range, and the voltage being less than the predetermined value, disable the fuel cell system.

3. The vehicle of claim 1, wherein the controller is further programmed to, responsive to the amplitude exceeding the threshold, the frequency of the cyclic changes being within the predetermined range, and the voltage being less than the predetermined value, increase a concentration of hydrogen in anodes of the fuel cell system.

4. The vehicle of claim 1, wherein the frequency associated with the anode injector system is a frequency of pressure pulses resulting from operation of the anode injector system.

5. The vehicle of claim 1, wherein the frequency associated with the anode injector system is a frequency associated with commands to actuate the anode injector system.

6. The vehicle of claim 1, wherein the frequency associated with the anode injector system is a frequency of changes in current associated with actuation of the anode injector system.

* * * * *